United States Patent [19]

Westland et al.

[11] Patent Number: 5,461,507
[45] Date of Patent: Oct. 24, 1995

[54] POLYMER MATERIAL OF THERMO-OPTICAL EFFECT FOR A BISTABLE OPTICAL DEVICE

[75] Inventors: Duncan J. Westland; Vladimir Skarda, both of Surrey, England; Werner Blau, Dublin, Ireland; Lorenzo Costa, Sommo, Italy

[73] Assignee: Enichem S.p.A., Milan, Italy

[21] Appl. No.: 710,132

[22] Filed: Jun. 4, 1991

[30] Foreign Application Priority Data

Jun. 5, 1990 [IT] Italy ..................... 20553A90

[51] Int. Cl.$^6$ ..................................... G02F 1/01
[52] U.S. Cl. ............. 359/289; 359/288; 359/243
[58] Field of Search .................. 359/288, 289, 359/45, 243, 107, 108

[56] References Cited

U.S. PATENT DOCUMENTS

| | | | |
|---|---|---|---|
| 4,720,175 | 1/1988 | Haus et al. | 359/289 |
| 4,782,492 | 11/1988 | McMahon et al. | 359/288 |
| 4,904,066 | 2/1990 | Gray et al. | 359/288 |
| 4,917,476 | 4/1990 | Makh et al. | 359/45 |
| 5,022,741 | 6/1991 | Dagenais et al. | 359/243 |

FOREIGN PATENT DOCUMENTS

| | | | |
|---|---|---|---|
| 2146787 | 4/1985 | United Kingdom | 359/43 |
| 2197495 | 5/1988 | United Kingdom | . |

OTHER PUBLICATIONS

H. J. Kong et al., Journal of Applied Physics, vol. 67, No. 10, Thermally Induced Optical Bistability and Self-Oscillation in a Nonlinear Etalon Filled With Optical Adhesive, May 1990, pp. 6066–6069.

XV International Conference of Quantum Electronics, Apr. 26–May 1, 1987.

A. D. Lloyd et al., Optics Communications, CW Optical Bistability in Non-Absorbing Liquids and Liquid Crystals Using HeNe and Diode Lasers, Mar. 1987, pp. 339–344.

Primary Examiner—Georgia Y. Epps
Assistant Examiner—Thomas Robbins
Attorney, Agent, or Firm—Rogers & Wells

[57] ABSTRACT

The present invention provides a bistable optical device in which the active medium is a polymer material of thermo-optical effect inserted into a cavity resonator, preferably a FABRY-PEROT resonance cavity, in said cavity the polymer material transmitting and reflecting an incident light wave with bistable values and values variable according to its thermal state. This latter is varied by the absorption of a fraction of the incident light wave, which transfers heat to the polymer material to generate therein an increase in the transmission of the incident light and a variable refractive index in response to the increase in its temperature, to thus provide a positive response effect which enables the device of the present invention to vary between two bistable states.

5 Claims, 4 Drawing Sheets

POLYMER MATERIAL OF THERMO-OPTICAL EFFECT FOR A BISTABLE OPTICAL DEVICE

This application claims priority under 35 U.S.C. §119 of Italian Application No. 20553 A/90.

FIELD OF THE INVENTION

This invention relates to a bistable optical device in which the active medium is a polymer material of thermo-optical effect inserted into a Fabry-Perot resonance cavity, in said cavity the polymer material transmitting and reflecting an incident light wave with bistable values and values variable according to its thermal state. Said thermal state is established by the absorption of a fraction of the radiant energy of the incident light wave of variable intensity.

BACKGROUND OF THE INVENTION

Devices or elements of bistable effect which when suitably incorporated into larger systems can function as data processors for executing operations or for storing information are already known, and are frequently used in constructing microprocessors for information technology or telecommunications use.

In constructing such devices, materials which demonstrate the bistable effect in certain of their characteristics are used. For example, a description of some of these materials is given in "Optical bistability: Controlling light with light", H. M. Gibbs, Academic Press 1985, page 120.

Research on materials of bistable effect have lead to the preparation of new materials and improvements in the characteristics of already known materials. The materials studied are not always "new". In this respect, they may have been known and been used for some time, but are still studied in order to discover new aspects of their physical behaviour which would allow the development of new devices offering interesting applicational developments, as will be apparent from the description of the device of the present invention.

It is opportune to briefly consider the materials which satisfy the aforesaid requirements and are currently proposed for known applications. These include inorganic semiconductors such as selenium oxychloride, which is able to maintain active ions such as neodymium ($Nd^{+3}$) in solution and present non-linear optical effects. This type of material provides an optical action with low threshold values. This is due to the presence of a very narrow fluorescent emission line similar to that of YAG (yttrium-aluminium-garnet) crystals.

Liquids providing non-linear optical emission are also known. These liquids are dye solutions, such as obtained by dissolving substances such as carbocyanine tetrafluoride, acridine red etc. in ethyl alcohol.

Materials of crystalline structure and glass structure are also known, these materials having become accepted as basic components in microelectronic semiconductor devices for the manufacture of logic circuits, microprocessors, memories and other information technology equipment. Materials of crystalline structure include mainly silicon, germanium, ruby etc., and also compounds such as gallium arsenide (GaAs), cadmium tetrafluoride (CdTe) and others. These materials must be available in crystalline form with a high degree of purity to be subsequently subjected to controlled additions of impurities (doping) in order to form semiconductor materials with precise electrical characteristics.

This observation emphasizes the importance of the degree of purity and the homogeneousness of "doping" in the production of materials, these characteristics even today being obtained only by complex and costly technological processes, with sometimes poor reproducibility of results, particularly for compounds.

Certain types of glass used as amorphous semiconductors have recently gained particular importance. The glasses used are mixtures of several compounds, of which in the current state of the art chalcogenide glass has suitable characteristics for constructing monostable and bistable switches for use in electronic processors and in industrial process control.

These amorphous semiconductors are still not widely used because they require the development of new techniques which have to ensure optimization of their composition, their reproducibility and their stability with time or variations in environmental conditions (thermal cycles).

The mechanism used to activate the bistable effect in the aforesaid materials is a thermally induced variation (thermal fluctuation) in the real part or in the imaginary part of the refractive index. It is known that thermal fluctuations alter the material density and consequently its refractive index.

In the specific case of semiconductor materials the bistable effect is generated by the energy band filling effect and by the excitonic band selection effect.

The excitonic bands correspond to the presence of excitons in the material, i.e. the existence of excited states which can concern either the entire material or a defined region of it, and can also propagate through the molecular structure of the material to transport energy without transporting the electric charge.

A lattice structure of a binary compound such as gallium arsenide (GaAs) has reached a power level of 10 milliwatts (mw) with a switch-up time of one picosecond (1 ps) and a switch-down time of 40 nanoseconds (40 ns) as specified in "Optical bistability: Controlling light with light", H. M. Gibbs, Academic Press 1985, page 305.

However, these considered materials have an exciton-creating optical absorption band width which is too narrow and a manufacturing cost which is too high, making the creation firstly of a material and then of an electronic device improbable. In addition to this, their technological limitations are still very severe. In this respect many problems concerning the homogeneousness of "doping" and the formation of ohmic contacts still have to be solved. Many techniques have been suggested for this latter problem, but the reproducibility of the results is modest.

It must also be noted that for most electronic or microelectronic applications a high switching speed corresponding to the aforesaid values is not required. The industrial production of doped crystals is difficult compared with the preparation of the polymer material of the present invention. Said polymer material enables an optical device to be formed which can operate at lower power levels than the doped glass used as amorphous semiconductors.

Said polymer material can also be integrated with other identical polymer material whereas the cells of the aforesaid liquids cannot be mutually integrated.

SUMMARY OF THE INVENTION

The main object of the present invention is therefore to provide a material of bistable effect which is prepared without having to use excessively complicated and costly technological processes, and is therefore able to replace the stated crystalline materials in the production of electronic devices in the various sectors of information technology and industrial automation. A further object of the present invention is to provide an optical device having a simple constructional structure and configured such that the defects and drawbacks connected with current arrangements of the art plus the aforelisted drawbacks are overcome.

For simplicity, reference will be made hereinafter to the use of the polymer material of bistable effect according to the present invention in the electronics of computers and electro-optical devices, it being understood however that its use extends to any other sector of electronics, such as industrial electronics, transport carrier electronics, medicine electronics and microelectronics of telecommunications devices. In accordance therewith and with respect to the aforesaid defects and drawbacks connected with applications of the known art, the present invention provides an optical device of bistable effect with a thermally induced variation, in which the active medium is a polymer material of thermo-optical effect which is inserted into a cavity resonator, within said cavity the polymer material transmitting and reflecting the incident light wave both with bistable values and with values variable in accordance with its own thermal state. Said thermal state of the polymer material is subjected to variation by the absorption of a fraction of the incident light wave, which transfers heat to the polymer material to generate in it an increase in incident light transmission as a result of the increase in its temperature, to thus provide a positive response effect which enables the device of the present invention to vary between two bistable states.

The said cavity resonator, in which the material of the present invention is placed, is a FABRY-PEROT resonance cavity of dimensions and geometrical shape appropriate to the specific requirement of the implementation of the present invention.

According to a further embodiment the cavity resonator is any cavity resonance resonator of known type.

According to a further embodiment the optical device of the present invention can be associated with several analogous devices mutually combined and integrated to form a single compact system functioning as an arithmetic and logic central unit of a computer, associated with complementary memory, interface and input and output functions for data and information defined by the user.

According to a further embodiment, the device of the present invention operates as a spatial light wave modulator and also operates as an optical storage system for coded information and data on the modulated light wave rays, to produce a memory block of wide applicational versatility.

According to a further embodiment the device of the present invention operates as a processor for several parallel data flows and also acts as a converter converting incoherent radiant energy into coherent radiant energy, being a selective optical blocking element based on frequency.

The index of refraction of the light wave incident on the polymer material of the optical device of the present invention is a function of the temperature assumed by the said polymer material, said incident light wave being subject to variable intensity.

The device of the invention is an optical device which for an incident light wave has a bistable transmission and reflection coefficient.

DETAILED DESCRIPTION OF THE INVENTION

The device consists of two partly reflecting surfaces forming a FABRY-PEROT resonance cavity in which a polymer material is placed. Specifically, the device described in the present invention is produced by depositing partly reflecting coatings 1 on sheets of polymer material 2.

The coatings 1 are such as to absorb only a fraction of the light wave striking them.

Said polymer material 2 has a refractive index which varies with its temperature, so triggering the thermo-optical effect.

On increasing the temperature of the polymer material by absorption of a fraction of the wave or of the incident monochromatic light band, the transmission of the light rays within said resonance cavity is increased and their reflection is decreased.

The increase in transmission of the incident light causes heating of the polymer material 2, which increases in temperature to provide a positive response effect, enabling the device of the present invention to vary between two bistable states.

For example, using an energy of 10 microjoules ($\mu J$) for a time of 1 millisecond (ms), passage occurs between the lower and higher transmission state and vice versa. The device of the invention absorbs 1 milliwatt (mw) of power.

Figure 1:
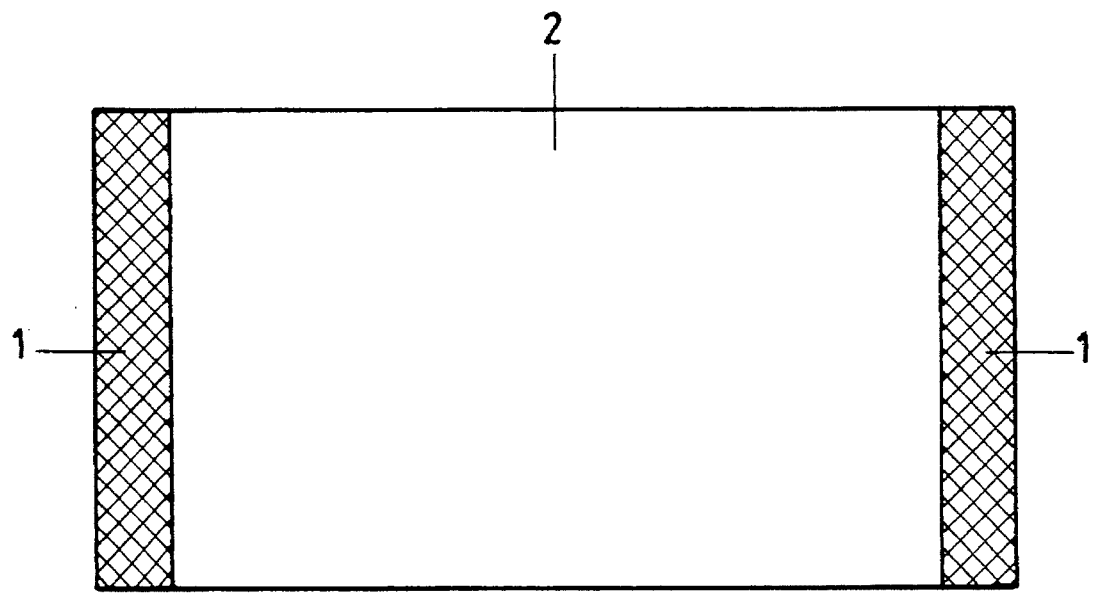
FIG. 1 is a schematic diagram of the device of the present invention.
Figure 2:
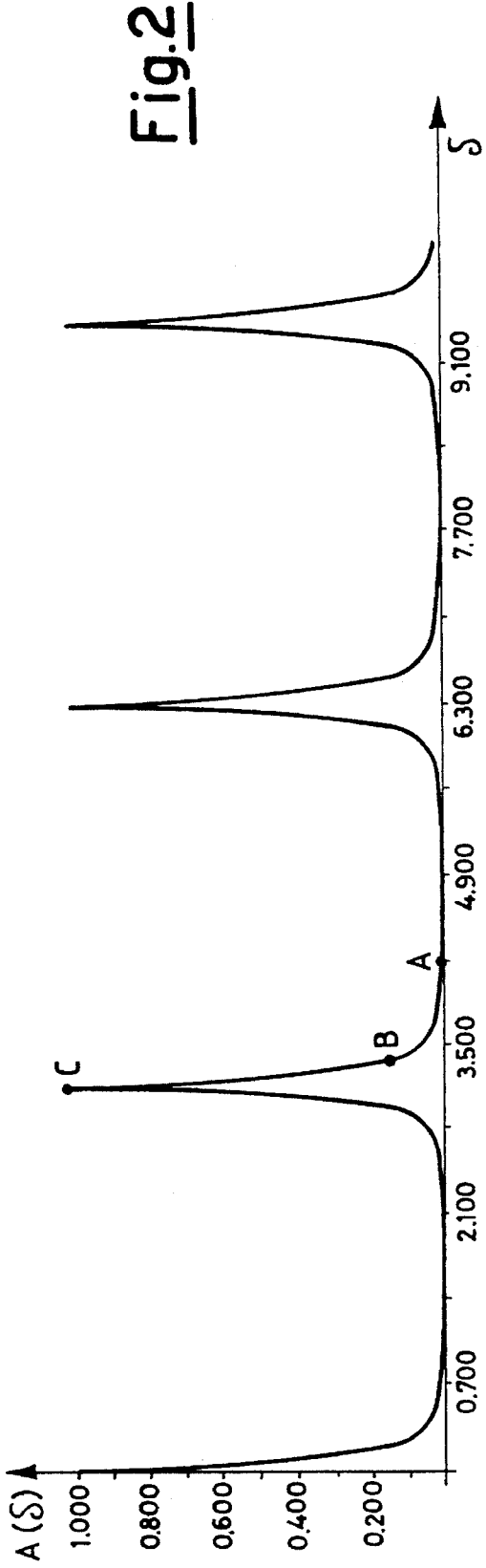
FIG. 2 is a graph of the Airy function with an accuracy coefficient F of 400.
Figure 3:
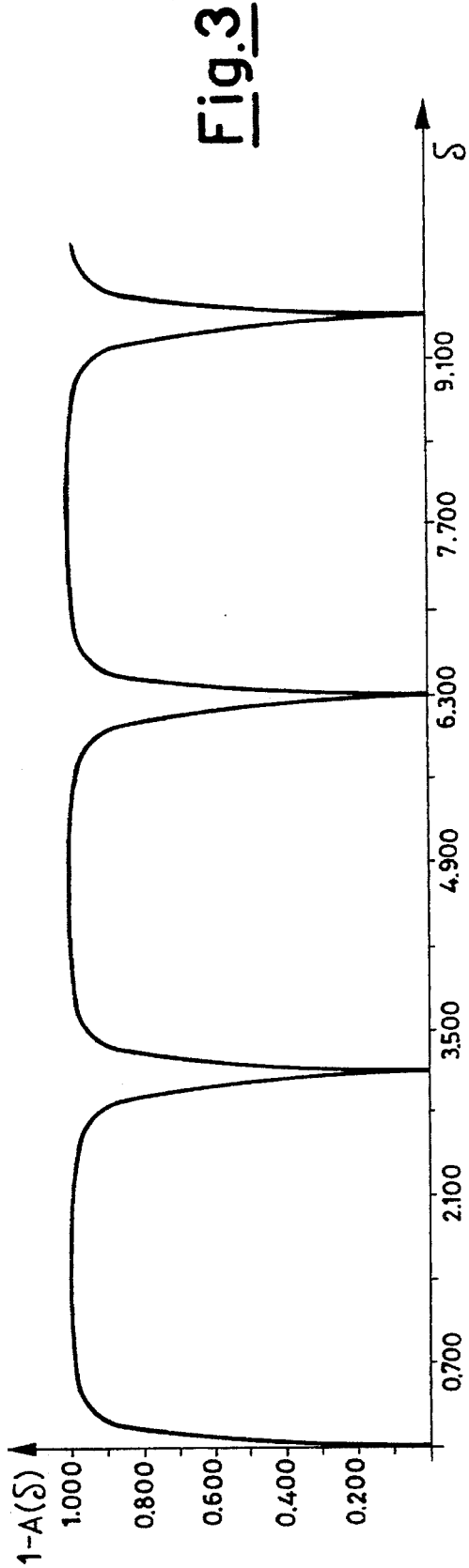
FIG. 3 is a graph of the complementary Airy function with an accuracy coefficient F of 400.

For a constant monochromatic light wave intensity, the transmission and reflection coefficient of the polymer material are related to the phase length of the device $\delta = nKl$ by a function proportional to the Airy function $[A(\delta)]$ the graph of which is shown in FIG. 2, and to the complementary Airy function $[1-A(\delta)]$ the graph of which is shown in FIG. 3. In the aforestated formula:

K is the in-vacuum component of the wave vector of the incident ray perpendicular to the partly reflecting coating 1;

l is the physical length of that part of the polymer material 2 between the coatings 1; and n is the refractive index of the polymer material which, to an acceptable approximation, can be defined by the equation $n(T) = n_o + \partial n/\partial T \cdot \Delta T$ where T is the temperature of the thermal state of the polymer material and $\Delta T$ is the temperature difference between T and the temperature at which the polymer material has the refractive index $n_o$.

For example typical values of $\partial n/\partial T$ for certain polymer materials are as follows:

Polymethylmethacrylate—$1.2[\partial n/\partial T \cdot 10^4 \cdot K^{-1}]$

Polycarbonate—$1.21[\partial n/\partial T \cdot 10^4 \cdot K^{-1}]$

Polyurethane—$3.31[\partial n/\partial T \cdot 10^4 \cdot K^{-1}]$

By suitably adjusting the wavelength of the light radiation

λ or the thickness of the thin layer of polymer material 2, the phase length of the device is moved close to the point A on the Airy function curve of FIG. 2 in the limiting portion of low intensity light radiation.

The light radiation intensity increases starting from said point A. The fraction of light radiation energy absorbed by the reflecting coatings 1 causes heating of the polymer material 2.

Said heating varies the thermal state of the material which by increasing its temperature varies its refractive index n and, specifically when polymers are used in which $\partial n/\partial T$ is negative, reduces the phase length of the device at the point B of FIG. 2. At the point B the transmission of the incident light wave in the device has increased and is hence greater than at the point A, this resulting in greater absorption of the incident light radiant energy by the partly reflecting coating. The thermal effect of the incident light rays consequently increases.

There is therefore a positive feedback effect, with the device operating in a state of high radiant light wave transmission, namely at the point C of FIG. 2.

As the fraction of the radiant energy of the incident light wave absorbed for heating purposes is now consistent, the device remains at the point C until the incident light wave is reduced to a lower intensity value. This occurs when the heating effect is unable to reduce the phase length of the device.

On decreasing the intensity of the radiant energy of the incident light wave the device cools and the transmission reduces to reduce the heating effect of the light and again return the device to the point A of FIG. 2, while the phase length increases.

Figure 4:
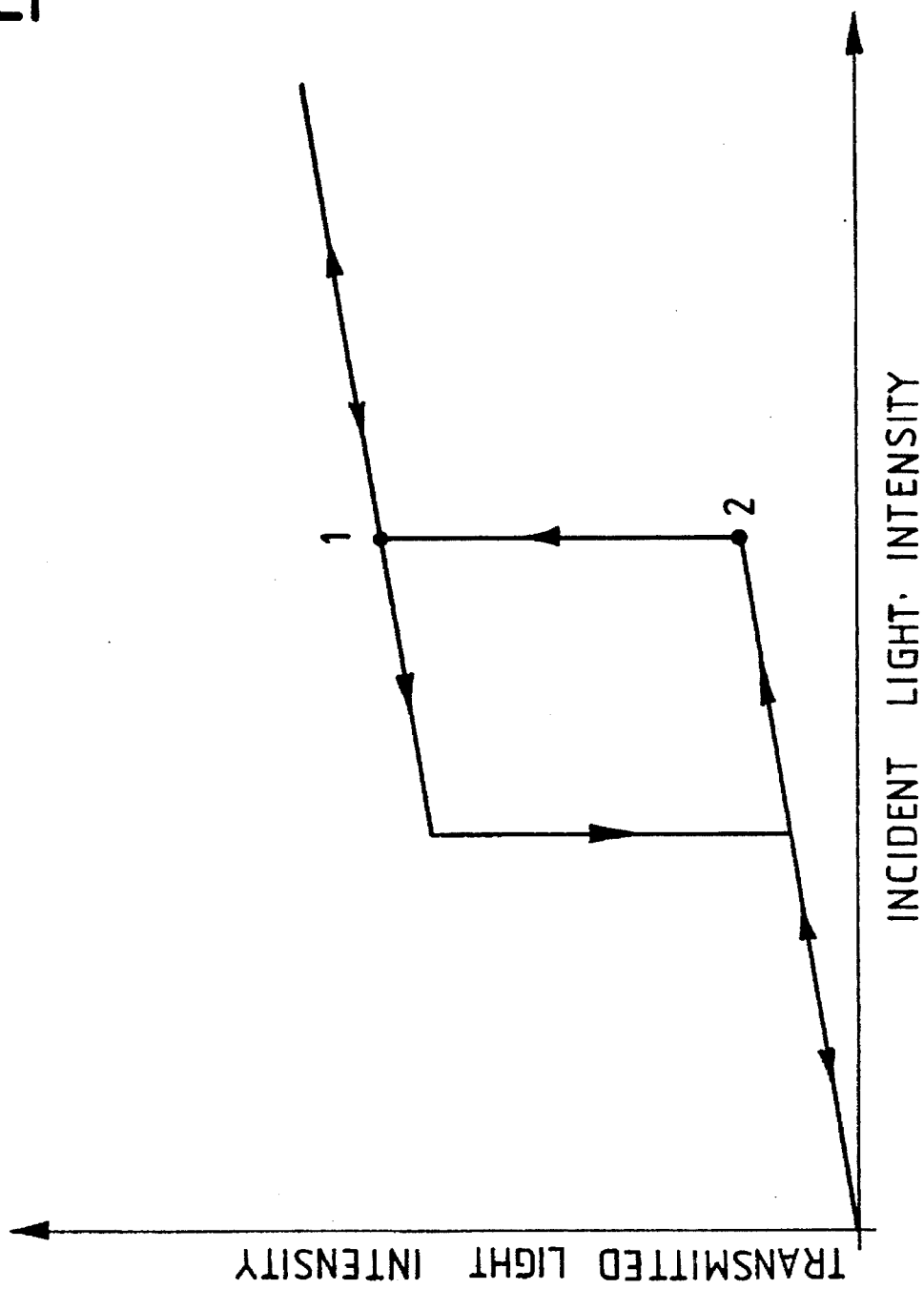
FIG. 4 shows the characteristic bistable transmission lines of the device of the invention when the device is used for transmission.

The device therefore assumes bistable transmission characteristics as schematically shown in FIG. 4. The reflected fraction of the light is regulated by a complementary Airy function in relation to the the phase length. This is shown in FIG. 3 for an accuracy coefficient F of 400.

The characteristic for the reflected light fraction has the reverse bistable pattern to that for the transmitted light fraction.

Figure 5:
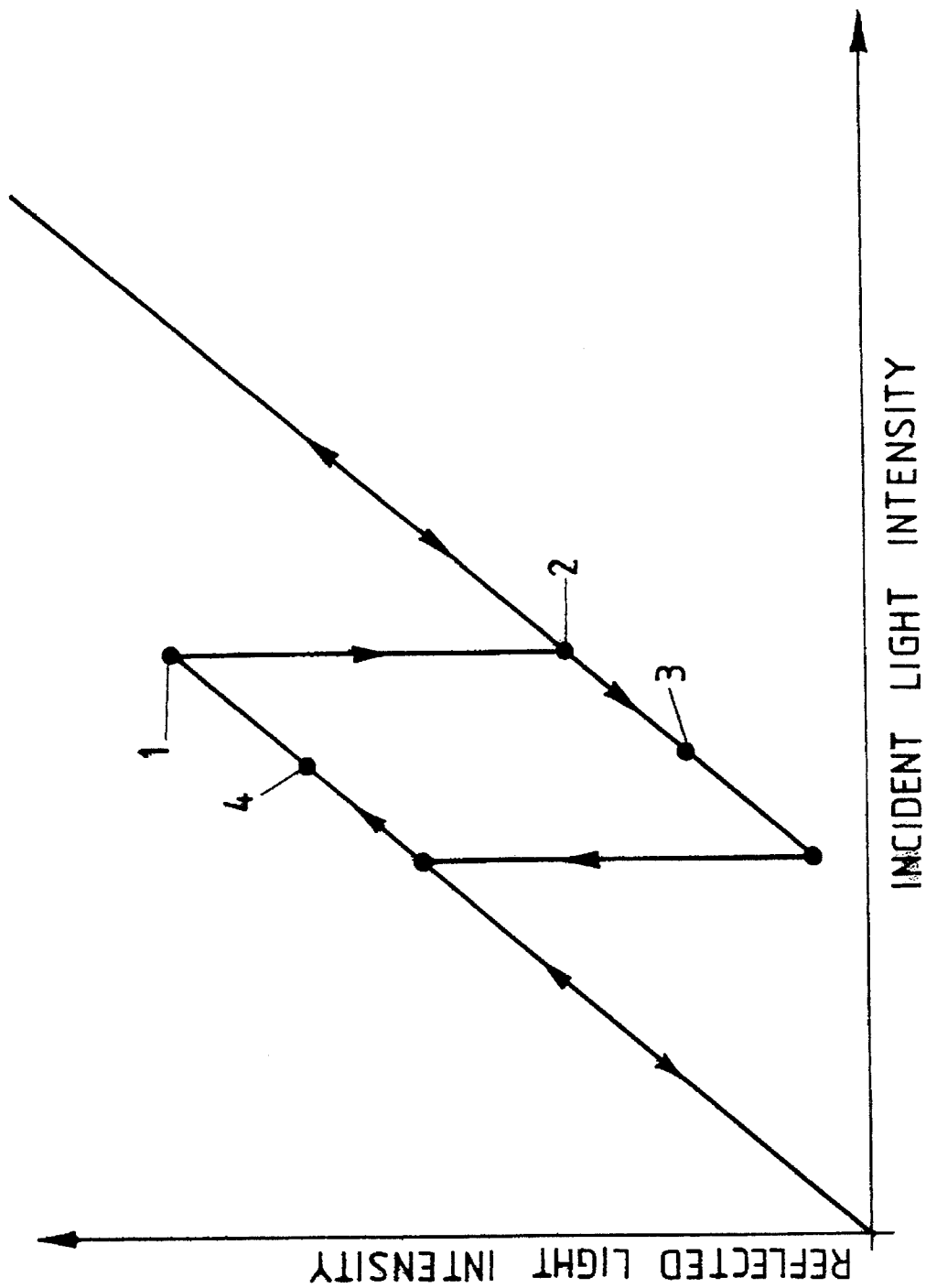
FIG. 5 shows the characteristic bistable transmission lines of the device of the invention when the device is used for reflection.

The reflected light characteristic is shown schematically in FIG. 5.

The invention is explained in detail hereinafter on the basis of some embodiments which are given by way of non-limiting example in that to the expert of the art it is apparent that the device call be used in numerous further applications without leaving the general idea of the present invention.

Operations as NAND Gate

NAND: logic operation with one output which is "true" if at least one of the inputs is "false", and is "false" if both the inputs are "true".

A two-input NAND gate is an element of type

| A | B | . | O |
|---|---|---|---|
| 1 | 0 | . | 1 |
| 1 | 1 | . | 0 |
| 0 | 0 | . | 1 |
| 0 | 1 | . | 1 | where 1 and 0 are binary logic elements and 0 is the output.

When the present invention forms a logic NAND gate, the inputs A and B are provided by two radiant light waves coincident on the input side of the bistable optical device of the invention. The device in said application is used in reflection.

The logic states of the radiant light waves A and B are represented at low intensity level (zero) to represent the logic "0", and at a small level of intensity, comparable with the intensity required for bistable operations, to represent the logic "1".

The energy for the logic operation is provided by a third light wave C of an intensity such that the sum of the intensities $$I_A + I_B + I_C$$

is sufficient to cause the device to switch down, whereas the sums of the intensities $I_A + I_B$ or $I_B + I_C$ are insufficient to trigger switch down.

Consequently, at the moment in which the light wave C is applied the device is at point 1 of FIG. 5, unless both light waves A and B are at the Ionic point "1", in which case the device switches its position to the point 2. If the reflected intensity at the point 2 is viewed as the point representing the logic point "0" and the reflected intensity at the point 1 is viewed as the point representing the logic point "1", the device executes the NAND operation on the light waves A and B.

The output is the NAND of A and B from the moment of application of the energy light wave C to when the light wave A or the light wave B varies.

It should be noted that the difference in reflected intensity $I_1 - I_2$ can be more than double the input intensity at the ionic point "1", and the device can hence have a fan-out greater than 1, which is of considerable importance for a logic element.

Operation as a Storage Device

The present invention can be used as an optical storage device (memory block).

The operation is similar to NAND operation, but in this application the device operates in transmission. In accordance with the preceding scheme of operation this would lead to an AND operation on the light wave A and on the light wave B, where AND (logic product) is a logic operator the output of which is "true" if all inputs are "true", but is "false" if only one input is "false".

If the device of the invention is used as an optical storage device, the light wave A is considered to be the input and the light wave B as an input command. After triggering the energy light wave C, the state of the light wave A is transferred to a transmitted light wave when the light wave B is brought to the logic point "1" (FIG. 4) and blocked when the light wave B is returned to a low intensity value.

Use as a Blocking Device

The present invention can be implemented to permanently change its output state on applying a pulsating input.

In this configuration the device is used in reflection (or in transmission if the output logic state is inverted). The device is initially zeroed by applying an input light wave of greater intensity than that represented by point 2 of FIG. 5.

The intensity is reduced until the device stabilizes at point 3 on the characteristic line of FIG. 5. The output is now viewed as a logic state "0". If the input is now brought momentarily to low intensity, on return the device is at point 4 on the characteristic line and is blocked in its logic state "1".

Description of a Preferred Embodiment of the Device of the Present Invention

A bistable optical device was constructed by the applicant by coating one side of a 100 micrometers (μm) polyester film with aluminium, to obtain a 10% transmission at 633 nanometers (nm).

The other side was coated with a thicker aluminium layer so as not to transmit the light waves. When the partially transmitting side was illuminated with a HeNe laser at 632.8 nanometers (nm) the device operated as a bistable optical device reflecting in reflecting mode. The non-linear mechanism was the thermo-optical effect in the polyester film.

The device had an energy capacity of 5 milliwatts (mw) and a switching energy of 50 microjoules (μj).

It is apparent that modifications can be made to the details of the device of the invention by an expert of the art, but without leaving the general idea of the present invention.

We claim:

1. An optical device of bistable effect on thermally induced variable, which comprises a cavity resonator with an active medium in said cavity, wherein the active medium is a polymer material of thermo-optical effect, said polymer material transmitting and reflecting in said cavity an incident light wave with bistable values which vary in accordance with the thermal state of said polymer material.

2. An optical device of bistable effect as claimed in claim 1, wherein the thermal state of the polymer material is varied by the absorption of a fraction of the incident light wave, which absorption of said fraction of said incident light wave transfers heat to the polymer material, which polymer material absorbs said heat, to generate therein an increase in the transmission of the incident light in response to the increase in temperature, to thus provide a positive response effect which enables the device of the present invention to vary between two bistable states.

3. An optical device of bistable effect as claimed in claim 1, wherein the incident light wave has variable intensity.

4. An optical device of bistable effect as claimed in claim 1, wherein the cavity resonator within which said polymer material is placed is a FABRY-PEROT resonance cavity.

5. An optical device of bistable effect as claimed in claim 1, characterised in that the index of refraction of the polymer material is a function of the temperature assumed by the said polymer material.

* * * * *